United States Patent [19]
Hoshino

[11] Patent Number: 5,406,746
[45] Date of Patent: Apr. 18, 1995

[54] PROTECTING BAG FOR GROWING FRUIT

[75] Inventor: Atsushi Hoshino, Shirone, Japan

[73] Assignee: Kabushiki Kaisha Hoshino Yoshiten, Japan

[21] Appl. No.: 191,233

[22] Filed: Feb. 3, 1994

[30] Foreign Application Priority Data

Feb. 5, 1993 [JP] Japan ................................ 5-042074

[51] Int. Cl.6 ............................................ A01G 13/00
[52] U.S. Cl. ...................................................... 47/26
[58] Field of Search ............................ 47/26 IF, 26 F

[56]           References Cited
         U.S. PATENT DOCUMENTS

| 383,327 | 5/1888 | Starr ....................................... 47/26 |
| 4,646,467 | 3/1987 | Morrisroe ............................... 47/26 |
| 4,952,443 | 8/1990 | Gravisse ................................. 47/26 |

FOREIGN PATENT DOCUMENTS

| 0026122 | 3/1981 | Japan ....................................... 47/26 |
| 1146129 | 7/1986 | Japan ....................................... 47/26 |
| 1234722 | 10/1986 | Japan ...................................... 47/26 |
| 3125555 | 5/1988 | Japan ....................................... 47/26 |
| 1063322 | 3/1989 | Japan ....................................... 47/26 |

Primary Examiner—Ramon S. Britts
Assistant Examiner—Joanne C. Downs
Attorney, Agent, or Firm—M. P. Williams

[57]           ABSTRACT

A protective bag is applied to fruit growing on a plant for protecting the fruit from disease, insects, birds and so forth. The bag is colored with a coloring agent which has a property to gradually lower its sunlight shielding characteristic in response to irradiation by sunlight. The coloring agent initially provides substantially complete sunlight shielding characteristic and the sunlight shielding characteristic is lowered at a given rate to its minimum sunlight shielding characteristics.

13 Claims, 1 Drawing Sheet

PROTECTING BAG FOR GROWING FRUIT

BACKGROUND OF THE INVENTION

1. Field of the Invention

The present invention relates to a protective bag for growing fruit, such as an apple. More specifically, the invention relates to a growing fruit protective bag which controls the level of exposure of the fruit to sunlight.

2. Description of the Related Art

On some farms, it is known to cover growing fruit, such as apples, with paper bags for protecting the growing fruit from disease and avoiding insects which eat the fruit during the growth and ripening period. In addition, by enclosing the fruit in a light shielding protective bag, the fruit becomes stiffer, to permit longer periods of storage. After sufficient growth of the fruit, the protective bag must be removed from the fruit to expose it to sunlight for coloring of the outer skin (ripening) of the fruit.

In removing the protective bag, care should be taken so that the fruit may not become sunburned, degrading the quality of the fruit. For this reason, it is typical to use protective bags having two layers of bags (occasionally three bags) for covering the fruit. When it is time to remove the protective bag, only an outer bag is initially removed, leaving the inner bag or bags on the fruit. The inner bag or bags are provided a certain level of permeability to sunlight so that a controlled amount of sunlight is irradiated onto the surface of the fruit. The inner bag is maintained on the fruit for another several days so that the fruit may be exposed to the sunlight in a controlled, limited amount for conditioning the fruit to the sunlight. After expiration of the conditioning period, the inner bag is removed to fully expose the fruit to the sunlight for coloring of the outer skin.

In such a conventional process of fruit growing, at least two separate steps of protective bag removal are required. Since the protective bag is provided for each individual piece of fruit, the protective bag removal operation is very labor intensive and time consuming. This clearly lowers efficiency in growing the fruit and results in high production cost.

SUMMARY OF THE INVENTION

In view of the inconvenience in the prior art, it is an object of the present invention to provide a novel growing fruit protective bag which requires only one bag removal step.

Another object of the invention is to provide a growing fruit protective bag which can control the level of exposure to sunlight (insolation) of the fruit without requiring removal of the bag.

In order to accomplish the above-mentioned and other objects, according to one aspect of the invention, a growing fruit protective bag to be applied to fruit growing on a plant for protecting the fruit from disease, insects, birds and so forth, comprises a bag colored with a coloring agent which has a sunlight shielding characteristic that is gradually reduced in response to irradiation by sunlight, the coloring agent initially providing a substantially complete sunlight shielding characteristic which is reduced at a given rate to the coloring agent's minimum sunlight shielding characteristic.

According further to the invention, the growing fruit protective bag further comprises means for controlling the amount of sunlight to be irradiated onto the colored bag.

The coloring agent may be composed of a first coloring component (such as dye) which has a first property of fading in response to exposure to sunlight and a second coloring component (such as a pigment) which has a second property of not fading in response to exposure to sunlight. The first coloring component is preferably a coloring dye, such as a dark blue dye, for example, and the second coloring component is a coloring pigment, such as a red pigment, for example. In this case, the first and second coloring components may be mixed at a given mixture ratio for attaining the given ratio of lowering of the sunlight shielding characteristic, such as approximately 8:2, for example.

The level of exposure to sunlight (irradiation) may be controlled by an outer cover surrounding the bag and having a given sunlight shielding characteristic. In this case, the outer cover provides an air layer between it and the bag for heat insulation.

In one embodiment, the protective bag comprises a first bag component colored by a first coloring agent which has a property to fade at a given rate by irradiation of sunlight and a second bag component formed separately from the first bag component and surrounding the first bag component, the second bag component being colored by a second coloring agent which has a property not to fade by irradiation of sunlight.

According to another aspect of the invention, a growing fruit protective bag to be applied to fruit growing on a plant for protecting the fruit from disease, insects, birds and so forth, comprises a first bag surrounding the fruit and colored with a coloring agent which has a property to gradually lower a sunlight shielding characteristic by irradiation of sunlight, the coloring agent initially providing substantially complete sunlight shielding characteristic and lowering the sunlight shielding characteristic at a given rate to a minimum sunlight shielding characteristic, and a second bag surrounding the first bag for limiting the sunlight irradiating the first bag, at a given limited amount of irradiation. Even in this case, the coloring agent may be composed of a first coloring component which has a first property of fading by exposure to the sunlight and a second coloring component which has a second property of not fading by exposure to the sunlight.

In a preferred embodiment, the first bag is formed of tissue paper and the second bag is formed of kraft paper. In one embodiment, the rate of lowering the sunlight shielding characteristic may be selected for achieving the minimum sunlight shielding characteristic during a period in a range of 70 to 80 days.

In the alternative, the first bag may comprise a first layer colored by a first coloring component which has a first property of fading by exposure to sunlight, and a second layer formed separately from the first layer and colored by a second coloring component which has a second property of not fading by exposure to sunlight.

According further to the invention, a method for controlling the level of exposure of growing fruit to sunlight comprises the steps of:

preparing a paper protective bag colored with a coloring agent which has a property to gradually lower its sunlight shielding characteristic by irradiation of sunlight, the coloring agent initially providing a substantially complete sunlight shielding characteristic which is lowered at a given rate to the minimum sunlight shielding characteristic of the coloring agent;

applying the protective bag to fruit on a plant so that sunlight impinging on the protective bag alters the permeability of the bag to sunlight, thereby lowering the sunlight shielding characteristic of the bag at a controlled, lowering rate; and removing the bag after the sunlight shielding characteristic reaches its minimum shielding characteristic for fully exposing the fruit to sunlight for ripening the fruit by direct irradiation of sunlight.

According to a still further aspect of the invention, a method for controlling the level of exposure of growing fruit to sunlight comprises the steps of:

preparing a first paper bag colored with a coloring agent which has a property to gradually lower a sunlight shielding characteristic by irradiation of sunlight, the coloring agent initially providing a substantially complete sunlight shielding characteristic and lowering the sunlight shielding characteristic at a given rate to the minimum sunlight shielding characteristic of the coloring agent;

preparing a second paper bag provided with a predetermined sunlight shielding characteristic;

applying the first and second bags to fruit on a plant, so that the first bag surrounds the fruit and the second bag surrounds the first bag so that the first bag is irradiated with sunlight in a controlled amount to thereby lower the sunlight shielding characteristic of the first bag at a controlled, lowering rate; and removing the first and second bags after the sunlight shielding characteristic of the first bag reaches the minimum characteristic, thereby fully exposing the fruit to sunlight for ripening the fruit by direct irradiation of sunlight.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
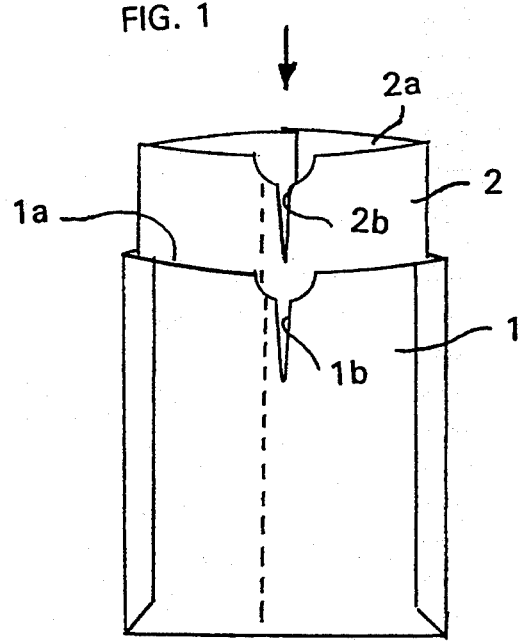
FIG. 1 is a front elevation view of the preferred embodiment of a growing fruit protective bag according to the present invention.

Referring now to the drawings, particularly to FIG. 1, the preferred embodiment of a growing fruit protective paper bag has a two-bag construction, including an outer bag 1 and an inner bag 2. The outer bag 1 is provided a predetermined and constant sunlight shielding characteristic (ratio of sunlight which is passed) so as to pass the sunlight in a controlled amount and/or intensity. On the other hand, the inner bag 2 is colored to initially provide a substantially complete sunlight shielding characteristic. A color provided in the inner bag 2 has the property of fading as a result of irradiation by the sunlight through the outer bag 1 to reduce the light permeability. The final light permeability of inner bag 2, after completely fading, is selected so that a limited amount or intensity of sunlight is irradiated on the surface skin of fruit and a desired degree of total sunlight shielding is attained in cooperation with the sunlight shielding characteristic of the outer bag 1. Therefore, when it is time to remove the protective bag, the desired final light permeability is established.

Figure 2:
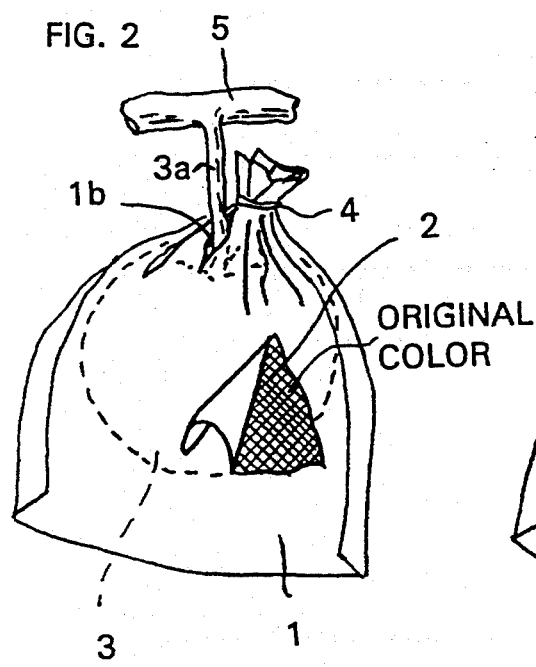
FIG. 2 is a partially broken open, perspective view of the preferred embodiment of the growing fruit protective bag applied to fruit, illustrating the condition before fading of a sunlight shielding color.
Figure 3:
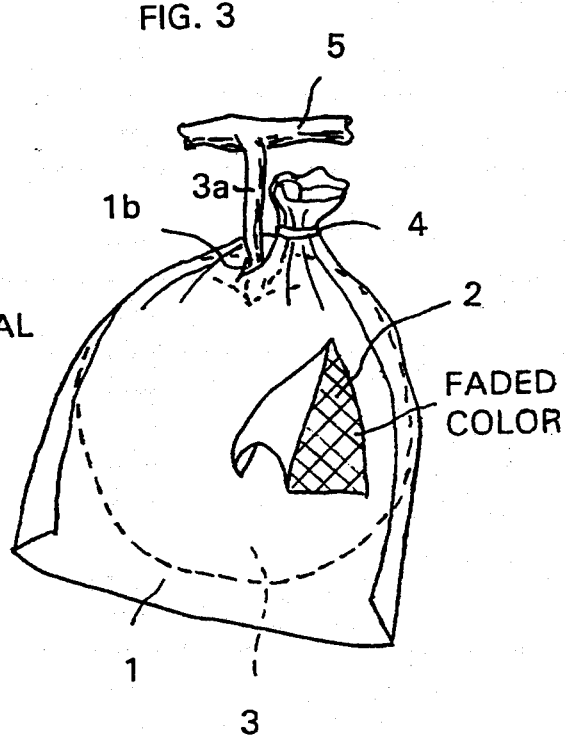
FIG. 3 is a partially broken open, perspective view of the preferred embodiment of the growing fruit protective bag applied to fruit, illustrating the condition after fading of a sunlight shielding color.

As seen in FIG. 1, the outer bag 1 has an open top end 1a to accommodate the inner bag 2. Similarly, the inner bag 2 has an open top end 2a. Both of the outer and inner bags 1 and 2 are formed with slits 1b and 2b for permitting a stem 3a of the fruit 3 to extend therethrough. As shown in FIGS. 2 and 3, the protective bag is applied to cover the overall surface of the fruit 3 (shown in broken line). Then, the top ends 1a and 2a of the protecting bag are tightened and fastened by a fastening strip 4. The stem 3a of the fruit 3 extends through the slits 1b and 2b to maintain the fruit on a branch 5 of the tree.

In the preferred embodiment, the outer bag 1 is formed from kraft paper having a weight of approximately 50 g/m$^2$. On the other hand, the inner bag 2 is formed from a kind of tissue paper having a weight in the range of approximately 25–27 g/m$^2$. The outer bag 1 is colored by a pigment to provide a desired sunlight shielding rate to pass a limited amount and/or intensity of sunlight therethrough. On the other hand, the inner bag 2 is colored to have substantially complete sunlight shielding at the initial stage, i.e. before fading of the color. In the preferred embodiment, but not limitative, the inner bag 2 is colored with an ordinary red paper pigment which does not fade and an ordinary dark blue paper dye which fades in response to irradiation by sunlight. The red pigment and the dark blue dye are mixed to prepare a coloring agent with which the tissue paper blank sheet is colored to provide a colored blank for forming the inner bag, which has a substantially complete sunlight shielding characteristic. The ratio of the fading dye and non-fading pigment may be varied, depending upon the desired fading period and the desired final sunlight permeability of the inner bag 2. In the preferred embodiment, the fading dye (i.e. dark blue dye) and the non-fading pigment (i.e., red pigment) are mixed in a rate of 8:2, for apples, as described below. It should be noted that a larger proportion of fading dye results in fading more quickly—that is, a shortened color fading period. Therefore, the ratio of the fading dye to the non-fading pigment should be varied depending upon the desired final sunlight shielding characteristic of the inner bag 2 and the desired fading period. For example, in northern temperate climates, the protecting bag is applied to the fruit 3 at the initial stage of growth, e.g., between the middle of June and early July for apples. The dye/pigment ratio is selected so that complete fading of color is achieved in approximately seventy to eighty days. After completion of fading and at an appropriate time determined by the growth condition of the fruit in the protective bag, the protective bag is removed from the fruit. For example, in northern temperate climates, the protective bag is removed from apples between early and middle September. It should be understood that the timing for applying and removing the protective bag to and from the fruit and the fading period are variable in many ways, depending upon the environmental conditions and the particular fruit being grown.

Once the protective bag is applied to the fruit as shown in FIG. 2, the outer bag 1 permits the limited amount and/or intensity of sunlight to irradiate on the surface of the inner bag 2. At the initial stage as illustrated in FIG. 2, since the inner bag 2 has substantially complete sunlight shielding characteristics, substantially no sunlight reaches the surface of the fruit 3. Therefore, during the initial period of growth, the fruit is not exposed to the sunlight. This stiffens the fruit so it may be stored for long periods of time.

During growth, a limited amount and/or intensity of sunlight is irradiated on the inner bag 2 through the outer bag 1. The sunlight irradiated on the inner bag 2 promotes fading of the fading color (from dark blue to lighter blue) to moderately increase the sunlight permeability of the inner bag. As set forth above, the fading speed is variable depending upon the mixture ratio of the fading dye and the non-fading pigment. Therefore, by adjusting the mixture ratio of the fading dye and the non-fading pigment, complete fading will achieve the desired final sunlight permeability at about the desired time where the growth of the fruit is substantially completed. Completion of the fading of the color in the inner bag 2 results in the desired final total protective bag sunlight shielding characteristic in combination with the sunlight shielding characteristics of the outer bag 1.

During the fading period, the outer surface of the fruit is subjected to moderately increasing amounts and/or intensity of sunlight. This successfully conditions the fruit to the impinging sunlight (insolation) gradually so that the fruit will not become sunburned when the protective bag is removed.

Therefore, according to the present invention, irradiation of the surface skin of fruit by sunlight can be satisfactorily controlled, without requiring two bag removing steps as is required in the prior art. Since the bag removal work is quite labor intensive and time consuming, elimination of a bag removal operation significantly reduces the work load and thus contributes to improved efficiency in fruit production.

The construction of the protective bag need not be limited to the illustrated details. For instance, although the embodiment of FIGS. 1–3 employs a single layer outer bag, the outer bag may be formed with two or more layers. Multi-layer construction of the outer bag may provide an air layer between the component plies, which will have a heat insulating effect. Such a heat insulating effect is also attained by the two-bag construction of the protective bag, consisting of the inner and outer bags, as set forth above. Also, although the foregoing embodiment employs the inner bag which is colored by the mixture of the fading dye and non-fading pigment, it is possible to form the inner bag in double ply construction to have one ply formed of paper colored by the fading dye and the other ply formed of paper colored by the non-fading pigment. In addition, the coloring of the material of the inner bag can be performed during the paper making process, or, alternatively, the coloring can be provided by printing the dye and pigment on the paper. Also, the whole protective bag may be constructed as single ply construction if desired, though a single ply construction may reduce the heat insulation effect.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiment set forth hereinbefore but to include all possible embodiments which can be embodied within the scope encompassed and equivalents thereof with respect to the features set out in the appended claims.

What is claimed is:

1. A growing fruit protective bag to be applied to fruit growing on a plant for protecting the fruit from disease, insects, birds and so forth, comprising:
   a bag colored with a coloring agent which has a sunlight shielding characteristic that is reduced in response to irradiation by sunlight, the coloring agent providing a sunlight shielding characteristic which is initially substantially complete, said sunlight shielding characteristic lowering at a given rate to a minimum sunlight shielding characteristic, wherein said coloring agent is comprised of a first coloring component which has a first property of fading by exposure to sunlight and a second coloring component which has a second property of not fading by exposure to sunlight.

2. A growing fruit protective bag as set forth in claim 1, which further comprises means for controlling the amount of sunlight irradiated on said bag.

3. A growing fruit protective bag as set forth in claim 2, wherein said controlling means comprises an outer cover surrounding said bag and having a given sunlight shielding characteristic.

4. A growing fruit protective bag as set forth in claim 3, wherein said outer cover defines an air layer between it and said bag for heat insulation.

5. A growing fruit protective bag as set forth in claim 1, wherein said first and second coloring components are mixed in a given mixture ratio for attaining said given rate of lowering of the sunlight shielding characteristic.

6. A growing fruit protective bag as set forth in claim 1, wherein said first coloring component is a coloring dye and said second coloring component is a coloring pigment.

7. A growing fruit protective bag as set forth in claim 6, wherein said coloring dye is a dark blue and said coloring pigment is a red pigment.

8. A growing fruit protective bag as set forth in claim 7, wherein said first and second components are mixed at a mixture ratio of approximately 8:2, respectively.

9. A growing fruit protective bag as set forth in claim 1, wherein said bag comprises a first bag component colored by a first coloring agent which has a property to fade at a given rate by irradiation of sunlight and a second bag component formed separately from and surrounding said first bag component, said second bag component being colored by a second coloring agent which has a property not to fade by irradiation of sunlight.

10. A growing fruit protective bag to be applied to fruit growing on a plant for protecting the fruit from disease, insects, birds and so forth, comprising:
    a first bag surrounding the fruit and colored with a coloring agent which has a sunlight shielding characteristic which is gradually lowered in response to irradiation by sunlight, said coloring agent initially providing a substantially complete sunlight shielding characteristic, said sunlight shielding characteristic lowering at a selected rate, when irradiated by sunlight, to a minimum sunlight shielding characteristic; and a second bag surrounding said first bag for limiting the amount of sunlight irradiating said first bag, wherein said coloring agent is comprised of a first coloring component which has a first property of fading by exposure to sunlight and a second coloring component which has a second property of not fading by exposure to sunlight.

11. A growing fruit protective bag as set forth in claim 10, wherein said first bag is formed from tissue paper and said second bag is formed from kraft paper.

12. A growing fruit protective bag as set forth in claim 10, wherein said rate is selected for achieving said minimum sunlight shielding characteristic during a period in a range of 70 days to 80 days.

13. A growing fruit protective bag as set forth in claim 10, wherein said first bag comprises a first layer colored by a first coloring component which has a first property of fading by exposure to sunlight and a second layer formed separately from said first layer and colored by a second coloring component which has a second property of not fading by exposure to sunlight.

* * * * *